(12) United States Patent
Izumo et al.

(10) Patent No.: US 9,024,213 B2
(45) Date of Patent: May 5, 2015

(54) WEIGHING DEVICE WITH A WINDPROOF WALL CENTERED ON A OPENING FOR THE WEIGHING MECHANISM, WITH A PLURALITY OF STEP PORTIONS CONCENTRIC ABOUT THE OPENING

(75) Inventors: Naoto Izumo, Kitamoto (JP); Hisanori Oda, Kitamoto (JP)

(73) Assignee: A&D Company, Limited, Tokyo (JP)

( * ) Notice: Subject to any disclaimer, the term of this patent is extended or adjusted under 35 U.S.C. 154(b) by 390 days.

(21) Appl. No.: 13/521,620

(22) PCT Filed: Dec. 27, 2010

(86) PCT No.: PCT/JP2010/007565
§ 371 (c)(1),
(2), (4) Date: Jul. 11, 2012

(87) PCT Pub. No.: WO2011/092797
PCT Pub. Date: Aug. 4, 2011

(65) Prior Publication Data
US 2012/0325566 A1 Dec. 27, 2012

(30) Foreign Application Priority Data
Jan. 26, 2010 (JP) ................................. 2010-014164

(51) Int. Cl.
*G01G 21/28* (2006.01)
(52) U.S. Cl.
CPC .............. *G01G 21/28* (2013.01); *G01G 21/286* (2013.01)
(58) Field of Classification Search
CPC .............................. G01G 21/286; G01G 21/28

USPC .................................................. 177/180, 181
See application file for complete search history.

(56) References Cited

U.S. PATENT DOCUMENTS

| | | | |
|---|---|---|---|
| 4,401,176 A | 8/1983 | Knothe et al. | |
| 4,762,190 A * | 8/1988 | Meixner | 177/181 |
| 4,893,686 A | 1/1990 | Chretien et al. | |
| 7,960,658 B2 | 6/2011 | Mock | |
| 8,067,705 B2 * | 11/2011 | Izumo et al. | 177/180 |
| 8,203,086 B2 * | 6/2012 | Izumo et al. | 177/180 |
| 2009/0194340 A1 | 8/2009 | Mock | |
| 2013/0068542 A1 * | 3/2013 | Izumo et al. | 177/25.12 |
| 2013/0292192 A1 * | 11/2013 | Jaia | 177/181 |

FOREIGN PATENT DOCUMENTS

| | | |
|---|---|---|
| EP | 2 088 406 A1 | 8/2009 |
| JP | 57-153223 A | 9/1982 |

(Continued)

*Primary Examiner* — Randy W Gibson
(74) *Attorney, Agent, or Firm* — Roberts Mlotkowski Safran & Cole P.C.

(57) ABSTRACT

The effect of air flow on a weighing dish is minimized by the following relatively simple arrangement. A mounting member (1) having a protection dike (1D), an engaging ridge (1B), and a outermost peripheral engaging wall (1A) formed in a concentric manner about an opening (1C) to insert therethrough a connecting portion (2A) is disposed on an upper casing (3) of a weighing device located on a lower surface of a weighing dish (2). First and second windproof walls (4, 5) are positioned by fitting to an inner peripheral wall of the engaging ridge 1B and the engaging wall (1A), respectively, and can be easily removed when necessary, such as for cleaning. For example, the second windproof wall (5) is formed higher than the first windproof wall (4), thereby enabling effective obstruction of air flow from the outside.

6 Claims, 4 Drawing Sheets

(56) References Cited

FOREIGN PATENT DOCUMENTS

| JP | S59-62519 U | 4/1984 |
| JP | S62-30125 U | 2/1987 |
| JP | 62-179615 A | 8/1987 |
| JP | 62-184436 U | 11/1987 |
| JP | 2-128530 U | 10/1990 |
| JP | 1995-014825 U | 4/1995 |
| JP | U2502949 U | 4/1996 |

* cited by examiner

WEIGHING DEVICE WITH A WINDPROOF WALL CENTERED ON A OPENING FOR THE WEIGHING MECHANISM, WITH A PLURALITY OF STEP PORTIONS CONCENTRIC ABOUT THE OPENING

TECHNICAL FIELD

The present invention relates to a weighing device capable of minute mass measurement, and particularly, to a weighing device with a windproof structure for minimizing the effect of air flow.

BACKGROUND ART

In mass measurement, vibration, atmospheric pressure, temperature, humidity, static electricity, magnetism, gravitational acceleration, etc., have been considered as error factors (disturbance).

Here, changes in atmospheric pressure, temperature, humidity, and gravitational acceleration out of the above-described error factors occur relatively gradually due to motion of heavenly bodies and weather changes, and have a dominant effect on the volume balance, mass balance, and the like, and an effect in terms of the performance of a weighing device appears as zero-point drifting over a long time. This problem can be solved by a zero-point operation before weighing except when the same sample is continuously measured for a long time.

On the other hand, for the error factors of vibration, static electricity, and magnetism, methods for actively eliminating or removing the factors have been established, such as providing a vibration removal, vibration isolation, or neutralization mechanism, distancing the source of magnetism, and carrying out magnetic shielding. In addition to physically eliminating the factors as such, a program for correcting measurements in response to disturbance factors has also been established.

In contrast to the foregoing error factors, wind pressure and air flow are sudden and often have an effect as an abrupt change in a weighing device capable of minute mass measurement, and thus a correction processing by a program for elimination of measurement errors is virtually impossible. Therefore, there have been proposed various windproof mechanisms for minimizing the effect of wind pressure and air flow on a weighing mechanism section for measuring the mass.

Air fluctuations as error factors in mass measurement include wind pressure that can be partially perceived as sound and air flow. In particular, the air flow of these is unstable and is longer in time than the wind pressure inmost cases. For example, in an operation to place a sample into a weighing chamber in a weighing device having a weighing chamber, the operation itself inevitably causes air flow, and the air flow has an effect on, for example, the weighing dish and load transfer mechanism to produce measurement errors. The air flow, not at all perceivable by a device user, frequently acts on the weighing device as a factor in producing measurement errors.

Moreover, when the temperature of the weighing chamber has risen higher than that of the outside of the device due to heat generated from an electronic substrate etc., even if the difference in temperature is very slight, air flow occurs when the weighing chamber is opened and closed, and in the case of a liquid sample, slight heat of vaporization generated when the liquid vaporizes or a slight fall in temperature of the liquid due to vaporization and the like also serves as a factor in causing air flow. It has been confirmed that the value of measurement errors due to the air flow reaches 10 mg when it is large. This value equals 100dig in a weighing device with a minimum display of 0.1 mg, which is equivalent to 10000dig in a 1 μg-weighing device, and serves as a major factor in measurement errors.

Because it is considerably difficult to address by a program the effect of measurement errors that incidentally occur due to air fluctuations, in particular, air flow as in the above, various mechanisms for reducing the effect of air flow on the weighing mechanisms, specifically, windproof mechanisms, have been proposed mainly by providers of devices for measuring minute mass such as electronic balances, but each mechanism has both advantages and disadvantages.

The following are patent documents that propose windproof structures.

Patent Document 1: Japanese Utility Model Registration No. 2502949
Patent Document 2: Japanese Published Unexamined Utility Model Application No. S59-062519
Patent Document 3: Japanese Published Examined Utility Model Application No. H07-014825

DISCLOSURE OF THE INVENTION

Problem to be Solved by the Invention

In addition to the devices described in the above-described patent documents, the proposals include one having an arrangement in which a double weighing chamber structure is provided by forming a small-sized weighing chamber within a weighing chamber, for measuring within the small chamber.

Here, as the effect of air flow, measurement errors become prominent when airflow (wind) enters a gap between a weighing dish and an upper case of a device located under the weighing dish. This is because inflow of air into a narrow space between the weighing dish and upper case causes large pressure fluctuations in the space, and the pressure fluctuations swing the weighing dish to cause instability of weighed values, measurement errors, etc.

From the point of view described above, it is the main technical object of the various windproof structures of the above-described proposals to prevent intrusion of airflow into a gap between the weighing dish and upper case wherever possible. With this point in mind, patent document 2 out of the above-described patent documents has an arrangement in which a folding ring is formed around the weighing dish, and is capable of protection against certain airflow, but it is undeniable that this arrangement can be used in a general purpose device having a relatively low resolution, while the performance is insufficient in a high-resolution weighing device called an analytical balance.

In the arrangement of patent document 3, a plurality of stages of ring bodies are disposed to provide windproofing, but there is a possible problem in this arrangement such that the height of the ring bodies can be adjusted, while the operation itself of performing a height adjustment causes an air flow. In the arrangement of a small-sized weighing chamber being formed in a weighing chamber, a considerable protective effect against air flow is expected to be exerted, but there is possible complication in operation and possible complication and increase in cost of the device arrangement.

In the arrangement of patent document 1, inflow of air into the gap between the weighing dish and upper case is prevented as much as possible by covering a peripheral edge of the weighing dish with a windproof ring so as to become close to the peripheral edge. This arrangement of a windproof ring being disposed close to the weighing dish can effectively prevent the most problematic inflow of air into the gap between the weighing dish and upper case.

However, it has been necessary for enhancing this effect to bring the weighing dish and windproof ring as close as possible, and there is, for example, a possibility that the weighing dish is caught by the windproof ring to produce measurement errors as a result of a sample falling between the peripheral edge of the weighing dish and windproof ring. Measurement errors also occur as a result of an airflow making direct contact with the weighing dish, but with regard to this point, the arrangement of the present patent document has not exactly been sufficient.

Means for Solving the Problem

The present invention has been made in view of the problems of the above-described conventional arrangements.

Specifically, the present invention is a weighing device with a windproof structure in which a plurality of windproof walls are disposed around a weighing dish. More specifically, the present invention is a weighing device with a windproof structure in which a windproof wall mounting member as a member for mounting a windproof wall is disposed under the weighing dish about the weighing dish as the center, the windproof wall mounting member has a plurality of step portions formed in a concentric manner about a connection pin provided in the weighing dish, and a plurality of windproof walls are disposed about the weighing dish as the center by disposing the windproof walls to engage with the step portions, respectively.

Effects of the Invention

Because a windproof wall mounting member is disposed on an upper portion of a casing of the weighing device about the weighing dish as the center, a predetermined number of windproof walls can be easily disposed about the weighing dish as the center by engaging lower edge portions of the windproof walls with predetermined step portions of the windproof wall mounting member.

Moreover, because mounting and removal of the windproof walls is considerably easy, a predetermined windproof wall can be disposed at a predetermined position according to the degree of necessity in an environment where the weighing device is installed.

Because both the windproof wall mounting member and windproof walls can be provided at relatively low cost, an economical windproof structure for a weighing device can be offered.

Further, the present arrangement can also be carried out for the conventional weighing devices if the windproof wall mounting member can be disposed therein.

EMBODIMENT 1

Hereinafter, a first embodiment of the present invention will be described in detail based on FIG. 1.

In the figure, reference numeral 1 denotes a member for mounting a windproof wall (hereinafter, referred to simply as a "mounting member"), and for example, is integrally formed by pressing a metal plate of aluminum or the like. The mounting member 1 is basically formed to have a planar shape that shows a similar figure to a planar shape of a weighing dish 2, and is disposed on an upper casing 3 of a weighing device. Hereinafter, description will be given of, as an example, a case in which the planar shape of the weighing dish 2 is a circle, and the mounting member 1 is also therefore circular in plan.

At an outer peripheral circular portion of the mounting member 1 that is circular in plan, an engaging wall to dispose a windproof wall to be described later is formed in a standing condition. There is also formed at the center of the mounting member 1 an opening 10 through which a connecting portion 2A that is provided in the weighing dish 2 and connects the weighing dish 2 to a weighing mechanism section is inserted.

Reference numeral 1B denotes an engaging ridge that is circular in plan, formed inside the engaging wall 1A and in a concentric manner with the opening 10 and the engaging wall 1A. Reference numeral 1D denotes a protection dike formed in a concentric manner with the engaging wall 1A, the engaging ridge 1B, and the opening 10, and in the illustrated arrangement, the protection dike is formed as a ridge that is similar to the engaging ridge 1B.

Reference numeral 4 denotes a first windproof wall mounted on the mounting member 1 arranged as in the above, and as a result of being formed to be annular having an outer diameter substantially equal to the inner diameter of the engaging ridge 1B or having an inner diameter substantially equal to the outer diameter of the engaging ridge 1B, and accordingly being positioned by fitting to an inner diameter portion of the engaging ridge 1B as illustrated, the first windproof wall 4 is disposed relatively close to the outer periphery of the weighing dish 2 and in a concentric manner with the opening 1C.

Reference numeral 5 denotes a second windproof wall. The second windproof wall 5 is formed to be annular in plan similarly to the first windproof wall 4, and formed with its outer diameter being substantially equal to the inner diameter of an inner wall of the engaging wall 1A or with its inner diameter being substantially equal to the outer diameter of an inner wall of the engaging wall 1A, and is accordingly fixed by fitting to the engaging wall 1A. Therefore, the second windproof wall 5 is also easily disposed on the mounting member 1. The first windproof wall 4 is formed with its height being substantially the same as that of an upper surface portion of the weighing dish 2, and for example, when the second windproof wall 5 is formed higher than the first windproof wall 4, air flow can thereby be effectively obstructed. Even when the second windproof wall 5 is formed higher, it is disposed at a position away from the weighing dish 2, and thus the wall height made higher as shown in the figure does not affect the operability, such as taking in and out of a sample. On the other hand, when the second windproof wall 5 is formed lower than the first windproof wall 4, weighing of an object larger in shape than the weighing dish 2 is enabled although the windproof effect is reduced as compared with when the second windproof wall 5 is formed higher. It has been confirmed by experiment that measurement errors due to air flow are greatly reduced even in a microgram-level precision weighing device by combining a plurality of stages of windproof walls as in the above.

Moreover, the protection dike 1D is formed under the weighing dish 2, and thus does not function to provide a windproof wall in a standing condition, but is formed as a means for preventing a spilt sample, which is mainly a liquid sample or the like, from intruding into the interior of the weighing device through the opening 10.

In addition, only the engaging ridge 1B is formed inside the engaging wall 1A to provide a windproof wall in a standing condition in the illustrated arrangement, but a larger number of windproof walls can also be disposed in a concentric manner by forming another engaging ridge(s) in a concentric manner with respect to the engaging ridge 1B. Alternatively, the forming number of windproof walls may be increased by forming windproof walls at an inner peripheral portion and outer peripheral portion of the engaging ridge 1B, respectively, by forming the engaging ridge 1B with a width slightly wider than that of the illustrated arrangement. Moreover, a description has been given of, as an example, the case in which not only the weighing dish 2 but also all windproof walls have circular planar shapes, but a case in which the weighing dish is, for example, quadrangular in plan, and a windproof wall having a similar planar shape is formed around the weighing dish is also included in the technical scope of the present embodiment. The meaning of being in a concentric manner in this case is that the members are common in their diagonals and an intersection thereof.

EMBODIMENT 2

FIG. 2 to FIG. 4 show a second embodiment.

First, referring mainly to FIG. 2, reference numeral 6 denotes a mounting member in the present embodiment. The mounting member 6 is formed to be circular in plan as shown in FIGS. 3 and 4. A central portion of the mounting member 6 is a recess 6A that is circular in plan, and there is formed at the center thereof an opening 6B through which the connecting portion 2A of the weighing dish 2 is inserted.

About the recess 6A as the center, a first step portion 6C1 is first formed in a concentric manner with the recess portion 6A. A second step portion 6C2 is then formed in a concentric manner outside the first step portion 6C1, and a third step portion 6C3 is then formed in a concentric manner outside the second step portion 6C2. Reference numeral 6D1 denotes an annular first flat portion formed between the first step portion 6C1 and the second step portion 6C2, and reference numeral 6D2 denotes an annular second flat portion formed between the second step portion 6C2 and the third step portion 6C3. As a result of the first to third step portions being sequentially formed via the flat portions as such, the step portions are arranged so as to descend sequentially like terraces toward an outer peripheral portion of the mounting member 6.

The first flat portion 6D1 and the second flat portion 6D2 are formed so as to descend with predetermined angles $\alpha 1$, $\alpha 2$ toward the outer peripheral portion of the mounting member 6 in the illustrated arrangement. In addition, both of the angles $\alpha 1$, $\alpha 2$ are approximately 2° to 3° so that the flat portions are formed as shallow slopes. As a result of arranging the flat portions so as to descend toward the outer peripheral portion of the mounting member 6 as such, even when a liquid sample spills during sample measurement, the spilt sample is caused to pass the step portions and flat portions and flow down toward the outer peripheral portion of the mounting member 6 by removing windproof walls to be described later after completion of the measurement, and thus intrusion of the liquid into the interior of the weighing device can be prevented, and cleaning after weighing can also be easily performed.

Peripheral walls of the second step portion 6C2 and third step portion 6C3 are formed substantially vertically. Accordingly, the windproof walls 4, 5 being annular in plan and having inner diameters substantially equal to the outer diameters of the step portions are caught by fitting to the second step portion 6C2 and the third step portion 6C3, respectively, to form a windproof structure. In addition, of course, a larger number of windproof walls can also be disposed by forming more step portions.

EMBODIMENT 3

FIG. 5 shows a third embodiment.

In this embodiment, there is an arrangement for more reliable engagement with windproof walls.

Reference numeral 7 denotes a mounting member according to the present embodiment, and from its center toward the outer periphery of the mounting member 7, there is disposed an opening 7A, a first flat portion 7B1, a first step portion 7C1, a second flat portion 7B2, a second step portion 7C2, a third flat portion 7B3, and a third step portion 7C3 formed in a concentric manner in this order.

Unlike the aforementioned embodiment, each of the first step portion, second step portion, and third step portion of the above-described arrangement is formed with its apex portion being higher than a flat portion located inside of itself, and therefore, the higher a formed apex portion, the higher a peripheral wall between itself and a flat portion located on its outer periphery is formed. When this point is described in detail by taking the second step portion 7C2 as an example, an apex portion of the second step portion 7C2 is formed higher than the flat portion 7B2 located inside of itself, and therefore, the higher a formed apex portion, the higher a peripheral wall between itself and the flat portion 7B3 located on its outer periphery is formed. Thus, the engagement state with the first windproof wall 4 and the second windproof wall 5 can be made more reliable without increasing the difference in height of the flat portions, specifically, without forming the mounting member 7 into an extremely acute truncated cone shape.

In addition, both the second flat portion 7B2 and the third flat portion 7B3 are drawn almost horizontally in the illustrated arrangement, it is desirable to arrange the flat portions so as to incline with predetermined angles toward the outer peripheral side and discharge a spilt liquid sample as in Embodiment 2. In this case, liquid outflow portions 7C2', 7C3' to serve as cut-aways for liquid outflow are formed in the second step portion 7C2 and the third step portion 7C3 formed in a concentric manner so that the liquid passes through the liquid outflow portions to flow down to the outer peripheral side of the mounting member 7. Moreover, in this case, when cut-aways corresponding to the forming positions of the liquid outflow portions 7C2', 7C3' are formed in lower end edges of the first windproof wall 4 and the second windproof wall 5 so as to open the liquid outflow portions 7C2', 7C3', a spilt liquid flows down sequentially toward the outer peripheral portion of the mounting member even during sample weighing.

Because there is a possibility of the occurrence of a slight air flow via the open portions in the above-described case, it is desirable to make consideration for minimizing the effect of air flow by avoiding disposing both liquid outflow portions 7C2', 7C3' on the same straight line, such as forming the liquid outflow portions 7C2', 7C3' displaced at, for example, 90° as in FIG. 5(B), that is, disposing the liquid outflow portions 7C2', 7C3' on different radii, respectively. Moreover, when the first windproof wall 4 and the second windproof wall 5 are removed after completion of the weighing to eliminate a spilt liquid without providing the cut-aways in the windproof walls, because the liquid outflow portions 7C2', 7C3' are closed by the first windproof wall 4 and the second windproof wall 5 during weighing, it is not necessary to make special consideration regarding the positional relationship of the liquid outflow portions 7C2', 7C3'. The first step portion 7C1 is located under the weighing dish 2, and thus no liquid outflow portion is formed in the first step portion 7C1 because a liquid does not spill thereon.

In connection to this, in the aforementioned arrangement of Embodiment 2, the heights of engagement (fitting) with the windproof walls are the formation heights of the second step portion 6C2 and the third step portion 6C3, that is, the heights of the peripheral walls of the step portions. Therefore, it is necessary to increase the heights of the peripheral walls for a more secure engagement with the windproof walls, but such formation results in an arrangement of the mounting member showing a truncated cone shape having a large difference in height toward its center, and thus it is desirable to adopt the aforementioned arrangement of Embodiment 3 for an increase in mounting strength of the windproof walls.

In addition, each of the embodiments has been described by taking, as an example, the case of mounting windproof walls that are annular in plan, but the planar shape of windproof walls is not limited to an annular shape, and the windproof walls can of course be formed to have a planar shape other than an annular shape, such as an angular shape including a quadrangular shape. In this case, the step portions of each of the embodiments are also formed to have a planar shape corresponding to the planar shape of windproof walls.

INDUSTRIAL APPLICABILITY

The present invention has been arranged aiming at use toward a high-resolution weighing device called an analytical balance, but can be effectively carried out also for a general purpose weighing device having a relatively low resolution that is likely to be used even in a severe environment with air flow due to an air conditioner and the like.

DESCRIPTION OF REFERENCE NUMERALS

Figure 1:
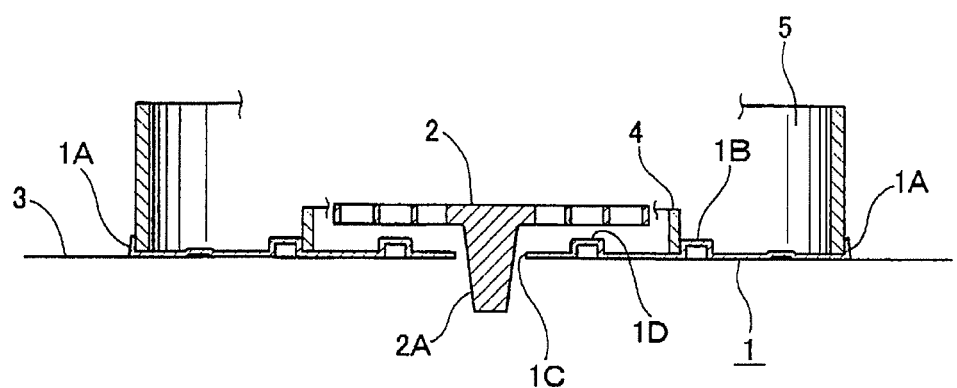
FIG. 1 is a sectional view of a mounting member and a weighing dish showing a first embodiment of the present invention.
Figure 2:
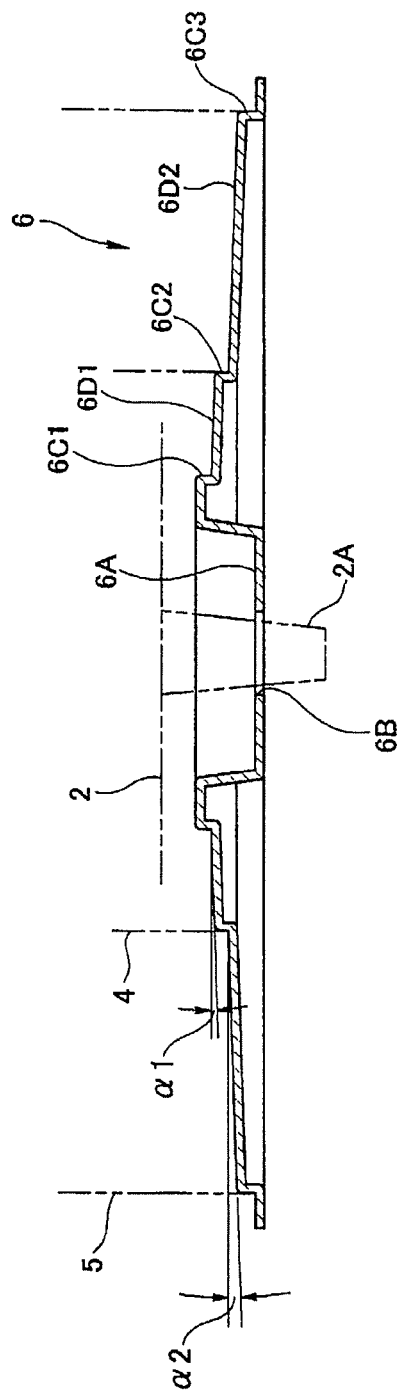
FIG. 2 is a sectional view of a mounting member showing a second embodiment of the present invention.
Figure 3:
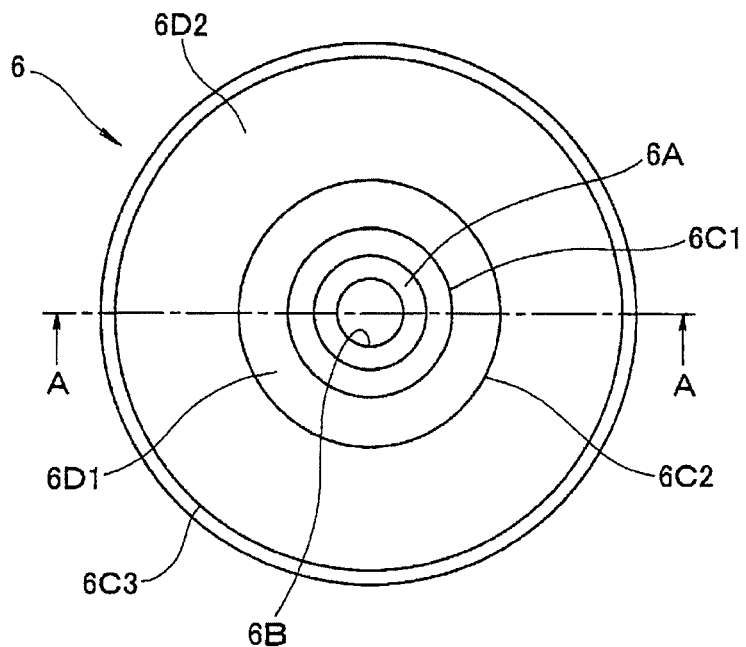
FIG. 3 is a plan view of the mounting member shown in FIG. 2.
Figure 4:
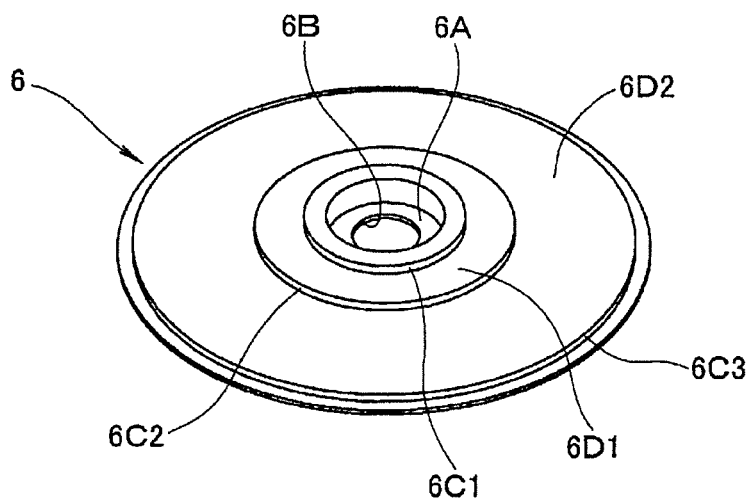
FIG. 4 is a perspective view of the mounting member shown in FIG. 2 and FIG. 3.
Figure 5:
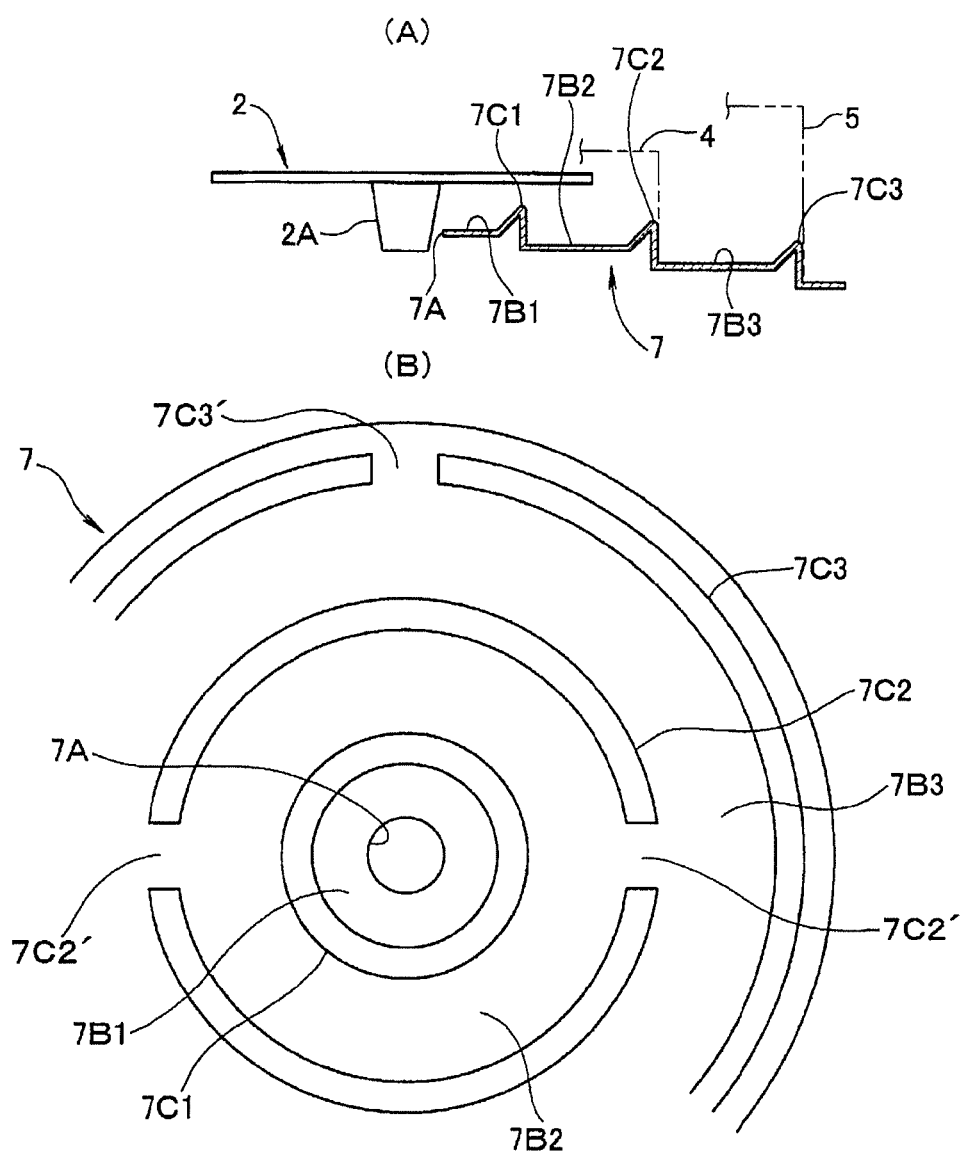
FIG. 5 shows a third embodiment of the present invention, in which (A) is a partial sectional view of a mounting member, and (B) is a partial planar view of the mounting member.

1 Mounting member
1A Engaging wall (of mounting member 1)
1B Engaging ridge (of mounting member 1)
1C Opening for inserting therethrough weighing dish connecting portion (of mounting member 1)
1D Protection dike (of mounting member 1)
2 Weighing dish
2A Connecting portion (of weighing dish)
3 Upper casing
4 First windproof wall
5 Second windproof wall
6 Mounting member
6A Recess (of mounting member 6)
6B Opening (of mounting member 6)
6C1 First step portion (of mounting member 6)
6C2 Second step portion (of mounting member 6)
6C3 Third step portion (of mounting member 6)
6D1 Second flat portion (of mounting member 6)
6D2 Third flat portion (of mounting member 6)
7 Mounting member
7A Opening for inserting therethrough connection pin (of mounting member 7)
7B1 First flat portion (of mounting member 7)
7B2 Second flat portion (of mounting member 7)
7B3 Third flat portion (of mounting member 7)
7C1 First step portion (of mounting member 7)
7C2 Second step portion (of mounting member 7)
7C3 Third step portion (of mounting member 7)
7C2' Liquid outflow portion (of second step portion 7C2)
7C3' Liquid outflow portion (of third step portion 7C3)

The invention claimed is:

1. A weighing device with a windproof structure, the weighing device being structured so as to transfer a load of a weighing object placed on a weighing dish to a weighing mechanism within the device via the weighing dish, in which a plurality of windproof walls are disposed around the weighing dish,
wherein a windproof wall mounting member centered on an opening through which a connecting portion for connecting the weighing dish to a mechanism section is inserted is disposed on an upper surface of the weighing device on which the weighing dish is disposed, a plurality of step portions are formed in a concentric manner about the opening in the windproof wall mounting member, and the windproof walls are fitted at lower end edges thereof to the respective step portions.

2. The weighing device with a windproof structure according to claim 1, wherein the windproof walls are formed so that the windproof wall located further on the outside about the weighing dish as a center is higher in height.

3. The weighing device with a windproof structure according to claim 1, wherein the step portions formed in a concentric manner via flat portions have formation heights that become lower toward the outer periphery of the mounting member.

4. The weighing device with a windproof structure according to claim 3, wherein each of the step portions is formed so as to project like a dike relative to a flat portion formed inside the step portion, an outer peripheral wall of the step portion is formed with a height higher by a height of the dike-like projection relative to a flat portion formed outside the step portion.

5. The weighing device with a windproof structure according to claim 4, wherein a cut-away to serve as a liquid outflow portion is formed in each of the step portions.

6. The weighing device with a windproof structure according to claim 5, wherein the liquid outflow portions are disposed on different radii having different angles in a plane of each of the step portions.

* * * * *